United States Patent [19]

Nakaya et al.

[11] Patent Number: 4,996,076
[45] Date of Patent: Feb. 26, 1991

[54] FILM FORMING METHOD

[75] Inventors: Toshiharu Nakaya; Satoru Nagahata, both of Osaka; Sakuichi Konishi, Nara; Koichi Kuwano, Osaka, all of Japan

[73] Assignee: Nippon Paint Co., Ltd., Osaka, Japan

[21] Appl. No.: 334,207

[22] Filed: Mar. 24, 1989

[30] Foreign Application Priority Data

Mar. 24, 1988 [JP] Japan .................................. 63-71148

[51] Int. Cl.$^5$ .............................................. B05D 3/06
[52] U.S. Cl. .......................................... 427/38; 427/39; 427/40; 427/41; 427/299; 427/307; 427/322
[58] Field of Search ...................... 427/38, 39, 40, 41, 427/299, 307, 322, 167.1

[56] References Cited

U.S. PATENT DOCUMENTS 4,534,995  8/1985  Pocock et al. ......................... 427/38
4,678,681  7/1987  Obayashi et al. ...................... 427/38

Primary Examiner—Stanley Silverman
Attorney, Agent, or Firm—Wenderoth, Lind & Ponack

[57] ABSTRACT

The invention concerns a method for forming a coating with excellent adhesion, water resistance and appearance which comprises the combination of steps of applying on the hydrophobic surfaces having a surface tension of 35 dyne/cm or less of a substrate a dry surface treatment selected from vacuum plasma treatment, corona discharge treatment and ozonization treatment, coating thus treated surfaces with a dispersion type aqueous coating composition comprising an aqueous varnish of at least one aqueous resin whose 1 wt % deionized water solution has a surface tension of 51 dyne/cm or less and which has a water tolerance of 4 or more, and water insoluble resin uniformly dispersed in fine particles in said varnish, the water insoluble resin having a SP value which is 1.0 to 2.2 lower than that of said aqueous resin, and baking the coating. The present method is specifically useful in the coating of automobile bodies, appliances and other high-quality products.

3 Claims, 1 Drawing Sheet

FILM FORMING METHOD

FIELD OF INVENTION

The present invention relates to a method for forming on a hydrophobic surface of a substrate a coating with excellent water resistance, appearance and adhesion properties by using an aqueous coating composition.

BACKGROUND OF THE INVENTION

From the standviews of resource-saving and environmental health, an aqueous paint based on a water soluble or dispersible binder resin has been widely used. However, most of the surfaces to be coated with such a paint are more or less of hydrophobic nature and therefore, are inadequate for the heretofore proposed aqueous coating compositions because of poor adhesion between the coating and substrate surfaces. An aqueous paint containing a water soluble or dispersible resin has in general a problem of poor water resistance of the formed coating. In the case of the so-called high solid aqueous paint, water insoluble resin particles are included in such a paint for the improvement in sagging property of the coating. However, since a surface active agent is likewise present in the system to assist the desired dispersion stability of the resin particles, the presence of such material will give an additional cause for the decrease in water resistance of the formed coating. Furthermore, an aqueous paint has another problems of poor gloss and smoothness of the coating.

Recently, for the improvements in water resistance and appearance of coating and storage stability of coating composition, have been proposed a technique of dispersing in an aqueous paint fine particles of a solution of insoluble resin in an organic solvent which is immiscible with water (Japanese Patent Publication (unexamined) No. 181367/87); and a technique of using an aqueous paint containing a particular amount of particular F-containing random copolymer (Japanese Patent Publication (unexamined) No. 158766/87) and the like. In these techniques, a particular aqueous resin or water insoluble resin is selectively used, thereby obviating the use of conventional surfactant and preventing the decrease in water resistance of the coating, and water insoluble resin is compounded in an aqueous paint, thereby improving gloss and smoothness of the resulted coating. However, in the formed coating, there always co-exist water soluble or dispersible resin and water insoluble resin, and attainable adhesion properties of the formed coating towards substrate surfaces are not enough.

It is, therefore, an object of the invention to provide a novel method for forming, on hydrophobic surfaces of a substrate, an excellent coating in respects of adhesion, water resistance and appearance, by using an aqueous coating composition.

SUMMARY OF THE INVENTION

The abovementioned object of the invention can be attained with a method wherein a substrate having hydrophobic surfaces with a surface tension of 35 dyne/cm or less is subjected to a dry surface treatment selected from vacuum plasma method, corona discharge method and ozonization method to convert the hydrophobic surfaces to hydrophilic ones, and then a dispersion type coating composition comprising an aqueous varnish of at least one aqueous resin whose 1 wt. % deionized water solution has a surface tension of 51 dyne/cm or less and which has a water tolerance of 4 or more, and water insoluble resin uniformly dispersed in the form of particles in said varnish, the water insoluble resin having a SP value which is 1.0 to 2.2 lower value than that of said aqueous resin, is applied thereto and a coating is formed.

DETAILED EXPLANATION OF THE INVENTION

Figure 1:
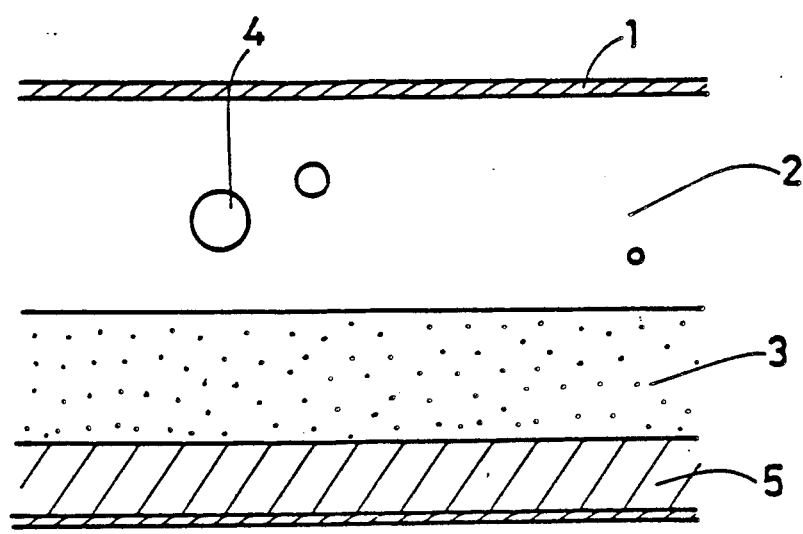
FIG. 1 shows a cross-sectional view of the coating obtained by the present method, in which a clear layer separation is observed.

According to the present method, is obtained a coating having a surface layer portion mainly composed of water insoluble resin and a center portion mainly composed of water soluble or dispersible resin, thereby simultaneously attaining the desired adhesion towards substrate surfaces and the improved coating properties as water resistance, gloss and smoothness. When the cross-section of the formed coating is examined by a microscope, there is a case wherein the boudary of said surface layer and the center portion is clearly observed by naked eyes and also a case wherein such a boundary line cannot be clearly detected Even in the latter case, when the composition of a surface layer portion (from surface to a depth corresponding to 10%, preferably 20%, of the total thickness of the coating) is compared with that of the center portion of coating, there is a distinct difference each other.

In the present invention, any of the substrate materials having hydrophobic surfaces may be satisfactorily used, including plastics, coated articles and the like. However, the invention intends to use the substrates having hydrophobic surfaces having a surface tension of 35 dyne/cm or less, which is believed to be difficult in obtaining a coating with good adhesion with a conventional aqueous paint. Such surfaces are first subjected to a dry surface treatment to convert them to the surfaces of hydrophilic nature. Such treatments themselves have been already known as, for example, vacuum plasma treatment, colona discharge, ozonization and the like, and any one skilled in the art may easily select an appropriate treating means depending on the material to be treated and working conditions used. Onto thus treated surfaces, is applied in the present invention an aqueous coating composition comprising an aqueous resin varnish in which water insoluble resin particles or particles of a solution of water insoluble resin in an organic solvent which is immiscible with water are uniformly dispersed. However, the aqueous resin varnish used in the invention should be an aqueous solution or dispersion of such aqueous resin which is characterized by that 1 wt. % aqueous solution of said resin should have a surface tension of 51 dyne/cm or less and water tolerance should be 4 or more, as disclosed in Japanese Patent Publication (unexamined) No. 181367/87. Examples of such resins are alkyd resin, polyester resin, epoxy resin, urethane resin, aminoplast resin, maleicoil, acrylic resin and the like.

In the present invention, in an aqueous varnish of at least one aqueous resin having the abovementioned characteristics, water insoluble resin as, for example, acrylic resin, alkyd resin, polyester resin, epoxy resin, aminoplast resin, acrylmodified alkyd resin, acryl-modified polyester resin and F containing resin is uniformly dispersed in the form of fine particles. However, it is essential in the invention that SP value of said water insoluble resin should be 1.0 to 2.2 low as compared with that of the abovementioned aqueous resin. This is because if the abovementioned difference is less than 1.0, it is unable to get the characteristic coating of the invention and if the difference is more than 2.2, the desired stabilized coating composition can hardly be obtained. Particularly preferable water insoluble resins are F-containing resins whose SP values are 1.0 to 2.2 low as compared with those of the aqueous resins co-used. Examples of such resins are:

(1) copolymer of a monomer having in its molecule both fluorine atom(s) and polymerizable double bond as, for example, perfluoro(meth)acrylates (e.g. perfluoro octanic acrylate, perfluoro octanic methacrylate and the like), fluoro(meth)acrylic acids (e.g. trifluoro methacrylic acid and the like), allyl heptadecafluoronate and the like, with other copolymerizable vinyl monomers, (2) copolymer of a monomer having in its molecule both fluorine atom(s) and condensable carboxyl or hydroxyl group or ester group capable of being entered into an ester exchange reaction, as, for example, perfluoro adipic acid or its ethyl ester, perfluoro octanic acid and the like, with other condensable monomers, (3) fluoroolefin- containing polymer as, for example, copolymer of fluoroolefin, cyclohexyl vinyl ether, alkyl vinyl ester and hydroxyalkyl vinyl ether, as stated in Japanese Patent Publication (unexamined) No. 34107/82, commercialized Lumifuron and the like.

As already stated, SP value of such F-containing resin should be 1.0 to 2.2 low as compared with that of the aqueous resin co-used. Suppose the SP value of an aqueous resin is 10.5, the SP value of F-containing polymer must be in a range of 8.3 to 9.5. Such SP value of F-containing polymer may be easily designed and controlled by using, other than F-containing monomer, an appropriate monomer having SP value of 9 or less, as, for example, styrene, ethyl hexyl acrylate or the like. In a particularily preferred embodiment of the present invention, a water insoluble resin is dissolved or dispersed in an organic solvent which is immiscible with water and such solution or dispersion is uniformly dispersed in an aqueous resin varnish in the form of fine particles (droplets).

The abovementioned aqueous coating composition is directly applied onto the previously treated hydrophobic surfaces of a substrate and the desired coating is obtained.

In this invention, an aqueous coating composition is used to a hydrophobic substrate surface, and nevertheless, the formed coating is excellent in adhesion property towards the substrate surface, and in water resistance, gloss and appearance comparable with those of the coating obtained by using a solvent type coating composition. As already stated, thus obtained coating, when examined its cross-section, shows in some cases a distinct layer separation and in other cases a distinct composition separation depthwisely. The exact reasons why such separation can be occurred have not been made clear yet, but as a matter of fact, water soluble or dispersible resin and water insoluble resin are localized each in different portion during coating and film-forming steps, participating in the improvements in adhesion between the substrate surface and the coating, and in the desired properties as water resistance, gloss and appearance. The present method is very useful in the coating of automobile body, appliances and other high quality products.

The invention shall be now more fully explained in the following Examples. Unless otherwise being stated, all parts and % are by weight.

MANUFACTURING EXAMPLE 1

Preparation of Water Insoluble Resin Solution (A)

An acrylic resin having OH value of 40, Tg of 30° C, number average molecular weight of 4,000 and SP value of 9.35 was dissolved in Solvesso 150 (Esso Petroleum) to obtain a resin solution (A) having a solid content of 80% and SP value of 9.20.

MANUFACTURING EXAMPLE 2

Preparation of Aqueous Resin Varnish (B)

To 100 parts of a solution (solid content 80%) of an acrylic resin having acid value of 60, OH value of 50 and number average molecular weight of 3,900 dissolved in Ethyl Cellosolve, were added 6.3 parts of dimethyl ethanolamine and 220 parts of water and mixed well to obtain an aqueous acrylic resin varnish (B) (solid content 25%, neutralization rate 80%, SP value measured by suspension method 11.0).

MANUFACTURING EXAMPLE 3

Preparation of Aqueous Paste (C) Containing Minute Droplets of a Water Insoluble Resin Solution 25 parts (as solid) of the resin solution (A) obtained in Manufacturing Example 1 and 80 parts (as solid) of the varnish (B) obtained in Manufacturing Example 2 were taken in a vessel, diluted with deionized water, and subjected to a dispersion operation with a laboratory mixer at 60° C. for 30 minutes to obtain an aqueous paste (C) having a viscosity (20° C.) of about 100 poises.

MANUFACTURING EXAMPLE 4

Preparation of Coating Composition (D)

The aqueous paste (C) obtained in Manufacturing Example 3 and Cymel 303 (trademark, Mitsui Cyanamid K.K., hexamethoxymethyl melamine, 100%) were taken in a vessel in a weight ratio of 105/10 and mixed well at a room temperature to obtain a coating composition (D).

MANUFACTURING EXAMPLE 5

Preparation of Water Insoluble Resin Solution (E)

Lumifron LFX4004 (trademark, Asahiglass K.K., F-containing random copolymer having as main constituting components fluoroolefin, cyclohexyl vinyl ether and alkyl vinyl ether, having acid value 7, SP value 9.5 and number average molecular weight 4,000) was dissolved in xylene to obtain a resin solution (E) having a solid content 50% and SP value 9.15.

MANUFACTURING EXAMPLE 6

Preparation of Aqueous Resin Varnish (F)

To 100 parts of a solution (solid content 80%) of an acrylic resin having acid value of 60, OH value of 72, number average molecular weight of 4,000 and SP value of 11.0 dissolved in Ethyl Cellosolve, were added 6.3 parts of dimethyl ethanolamine and 220 parts of water and mixed well to obtain an aqueous acrylic resin varnish (F) (solid content 25% and neutralization rate 80%.

MANUFACTURING EXAMPLE 7

Preparation of Aqueous Paste (G) Containing Minute Droplets of a Water Insoluble Resin Solution The resin solution (E) obtained in Manufacturing Example 5 and the aqueous resin varnish (F) obtained in Manufacturing Example 6 were taken in a vessel in a solid weight ratio of 1/1, diluted with deionized water, and subjected to a dispersion operation with a laboratory mixer at 60° C. for 30 minutes to obtain an aqueous paste (G) having a viscosity (20° C.) of about 100 poises.

MANUFACTURING EXAMPLE 8

Preparation of Coating Composition (H)

The aqueous paste (G) obtained in Manufacturing Example 7 and Nikalack MX-45 (trademark, Miwa Chemical K.K., methyl, n-butyl mixed ether type melamine) were taken in a vessel in a weight ratio of 105/10 and mixed well at a room temperature to obtain a coating composition (H).

MANUFACTURING EXAMPLE 9

Preparation of Comparative Coating Composition (I)

The aqueous resin varnish (F) obtained in Manufacturing Example 6 and Nikalack MX-45 (trademark, Miwa Chemical K.K., methyl, n-butyl mixed ether type melamine) were taken in a vessel in a weight ratio of 105/10 and mixed well at a room temperature to obtain a comparative coating composition (I).

EXAMPLE 1

A hard polypropylene sheet was exposed to plasma at 20 KV for 10 seconds, air sprayed with a coating composition (D) obtained in Manufacturing Example 4 to give a coating with dry film thickness 40$\mu$, allowed to set and baked at 140° C. for 30 minutes to obtain a coated polypropylene sheet. 2×2 mm cross-cuts were made on the coating, and peeling test was carried out with an adhesive tape Adhesion property of said coated sheet was evaluated by checking the remaining cross-cuts (original total cross-cuts 25) and following the criteria:

| remaining cross-cuts |
| --- |
| 25/25 |
| 15 to 24/25 |
| 5 to 14/25 |
| 0 to 4/25 |

Adhesion property of thus obtained coating was excellent. When the cross-section of the coating was examined microscopically, a clear layer separation was observed as shown in FIG. 1.

COMPARATIVE EXAMPLE 1

Onto a similar polypropylene sheet as used in Example 1 but not exposed to plasma, the coating composition (D) obtained in Manufacturing Example 4 was applied and baked to obtain a coating, which was then tested as in Example 1. The test result was given in Table 1. In this case, no layer separation like FIG. 1 was observed.

EXAMPLE 2

A steel plate was previously coated with an automobile intermediate paint Orga P 2 (trademark, Nippon Paint Co., alkyd-melamine based intermediate coating composition) and surface-treated by exposing the coating to 500ppm Ozone atmosphere for 10 minutes. Next, the coating composition (H) obtained in Manufacturing Example 8 was applied by airspraying means so as to give a coating with dry film-thickness of 25 $\mu$ and the coating was, after setting, baked at 140° C. for 30 minutes to give a coated plate. The same adhesion test as stated in Example 1 was carried out and the test result was given in Table 1. Then, F contents of the surface layer portion (up to 3$\mu$ depth) and the center portion (15 $\mu$ depth portion) of said coating were measured by using FT IR method (around 1170 cm$^{-1}$ peak) and the test results were shown in Table 1. From these datas, it was confirmed that water insoluble resin was localized mainly in the surface layer portion of the coating.

COMPARATIVE EXAMPLE 2

The similar experiments as stated in Example 2 were repeated excepting omitting the ozonization of test plate. Adhesion test result and F contents in the surface layer portion and the center portion of the coating were given in Table 1.

COMPARATIVE EXAMPLE 3

The similar experiments as stated in Example 2 were repeated excepting substituting comparative coating composition (I) obtained in Manufacturing Example 9 for the coating composition (H). As is clear from the test result given in Table 1, the coating adhesion property was no good.

TABLE 1

| | Ex. 1 | Comp. 1 | Ex. 2 | Comp. 2 | Comp. 3 |
| --- | --- | --- | --- | --- | --- |
| aq. coat. composition | D | D | H | H | I |
| surface treat. | plasma | — | ozone | — | ozone |
| layer separation microscop. | yes | no | — | — | — |
| F-content in | | | | | |
| surface layer port. | — | — | 85% | 52% | — |
| center port. | — | — | 43% | 52% | — |
| adhesion | O | X | O | X | X |
| SP difference | 1.80 | 1.80 | 1.85 | 1.85 | 0 |
| surf. tent. of substrate (dyne/cm) | 31.0 | 31.0 | 34.0 | 34.0 | 34.0 |

MANUFACTURING EXAMPLE 10

Preparation of Solid Water Insoluble Resin Particles (J)

An acrylic resin composed of 50 parts of methyl methacrylate, 20 parts of glycidyl methacrylate and 30 parts of $CH_2=CH-COOCH_2-(CF_2)_8-CF_3$, and having number average molecular weight of 3,500, softening point of 100° C. or more and SP value of 8.85, was pulverized to obtain the resin particles (J).

MANUFACTURING EXAMPLE 11

Preparation of Aqueous Resin Varnish (K)

An alkyd resin having acid value 55, number average molecular weight 1,360 and SP 10.5 was neutralized with dimethyl ethanolamine and diluted with water to obtain an aqueous resin varnish (K) having a solid content of 30%.

MANUFACTURING EXAMPLE 12

Preparation of Coating Composition (L)

100 parts of the resin particles (J) obtained in Manufacturing Example 10 and 300 parts of the aqueous resin varnish (K) obtained in Manufacturing Example 11 were stirred well at 65° C. for 1 hour to obtain a coating composition (L).

MANUFACTURING EXAMPLE 13

Preparation of Water Insoluble Resin Liquid (M)

80 parts of liquid acrylic resin (containing styrene) having Tg −20° C., OH value 50, SP value 9.15 and Mn=2,800 and 20 parts of Desmodule BL-1100 (blocked isocyanate) were mixed well to obtain a resin liquid (M).

MANUFACTURING EXAMPLE 14

Preparation of Coating Composition (N)

Water insoluble resin liquid (M) obtained in Manufacturing Example 13 and aqueous acrylic resin varnish (B) obtained in Manufacturing Example 2 were mixed well in a solid weight ratio of 30/70 and subjected to dispersion operation at 50° C. for 30 minutes to obtain a coating composition (N).

EXAMPLE 3

Onto a similar hard polypropylene sheet previously surface-treated by plasma as used in Example 1, was applied by air-spraying means a coating composition (L) of Manufacturing Example 12 to a dry-film thickness of 45µ, and the coating was baked at 140° C. for 30 minutes. Coating adhesion was tested as in Example 1 and F contents of surface layer portion and the center portion of the coating were measured as in Example 2. The test results are shown in Table 2.

COMPARATIVE EXAMPLE 4

The similar experiments as stated in Example 3 were repeated excepting omitting the plasma surface treatment.

EXAMPLE 4

Onto a similar test plate as used in Example 2, was applied by air-spraying means the coating composition (N) of Manufacturing Example 14 to a dry-film thickness of 45 µ, and the coating was baked at 160° C. for 25 minutes. Coating adhesion was tested as in Example 3 and styrene contents of the surface layer portion and the center portion of the coating were measured by PGC method (curie point 540° C.). The test results are shown in Table 2.

COMPARATIVE EXAMPLE 5

The similar test plate as stated in Example 2 but not surface treated was coated with the coating composition (N) and baked as in Example 4. Coating adhesion and styrene contents of surface layer portion and center portion of the coating were tested and the test results were shown in Table 2.

TABLE 2

| | Ex. 3 | Comp. 4 | Ex. 4 | Comp. 5 |
|---|---|---|---|---|
| aq. coat. composition | L | L | N | N |
| surface treat. | plasma | — | plasma | — |
| layer separation microscop. | — | — | — | — |
| F-content in | | | | |
| surface layer port. | 73% | 46% | — | — |
| center port. | 45% | 44% | — | — |
| St-content in | | | | |
| surface layer port. | — | — | 52% | 18% |
| center port. | — | — | 12% | 12% |
| adhesion | O | | O | |
| SP difference | 1.65 | 1.65 | 1.85 | 1.85 |
| surf. tent. of substrate (dyne/cm) | 31.0 | 32.0 | 34.0 | 34.0 |

We claim:

1. A method for forming a coating having a surface layer portion mainly composed of a water insoluble resin and a center portion mainly composed of a water soluble or dispersible resin on a hydrophobic surface of a substrate by using an aqueous coating composition characterized by subjecting a hydrophobic surface having a surface tension of 35 dyne or less to a dry surface treatment selected from a vacuum plasma treatment, a corona discharge treatment or an ozonization treatment, coating the thus-treated surface with a dispersion type aqueous coating composition varnish of at least one aqueous resin whose 1 wt. % deionized water solution has a surface tension of 51 dyne/cm or less and which has a water tolerance of 4 or more, and a water insoluble resin uniformly dispersed in fine particles in said varnish, said water insoluble resin having an SP value which is 1.0 to 2.2 lower than that of said aqueous resin, and baking the coating.

2. A method according to claim 1, wherein the water insoluble resin is dissolved or dispersed in an organic solvent which is immiscible with water and dispersed in fine particles in the aqueous resin varnish.

3. A method according to claim 1, wherein the water insoluble resin is F-containing polymer.

* * * * *